Inventor
William B. Wines

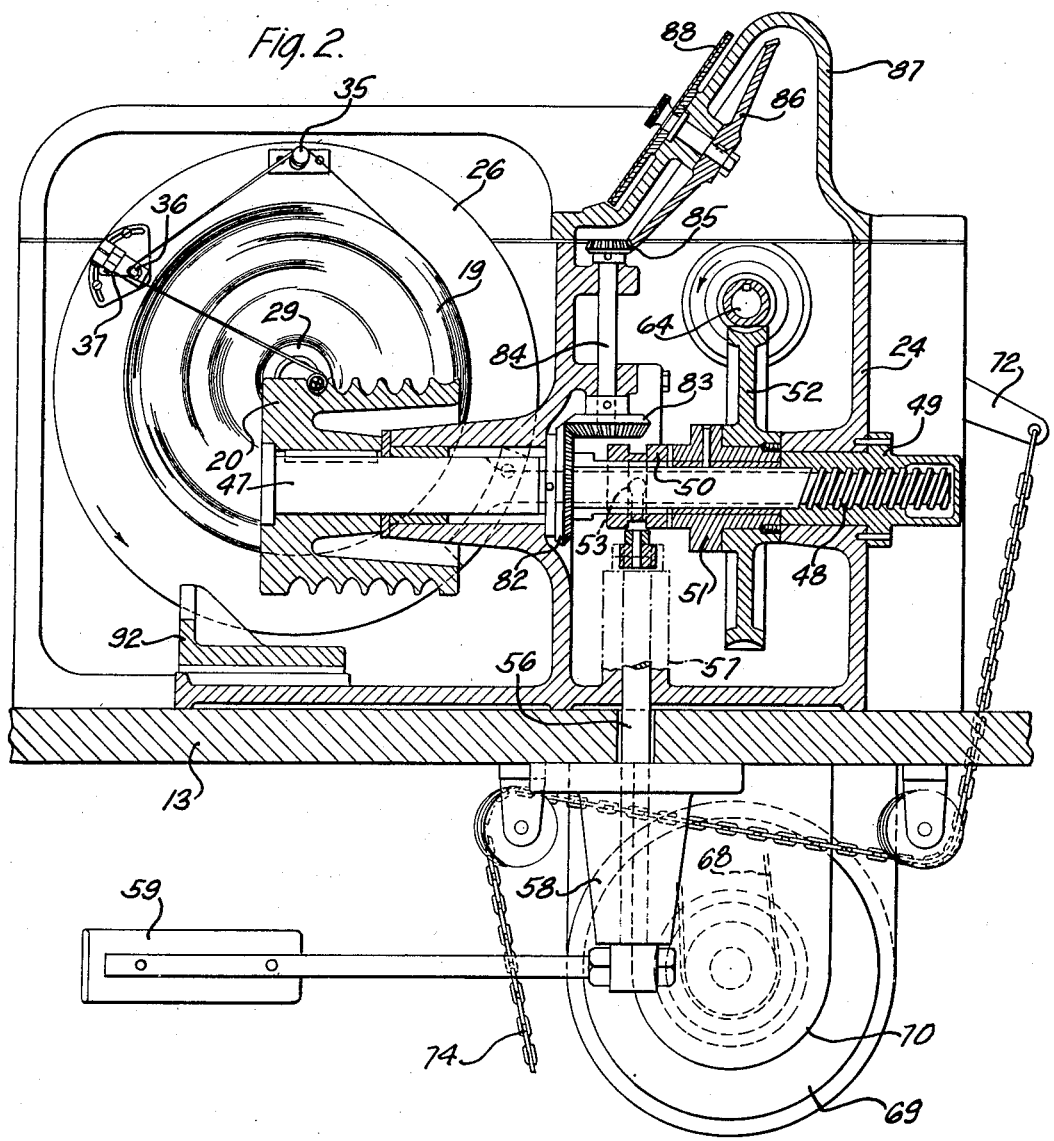

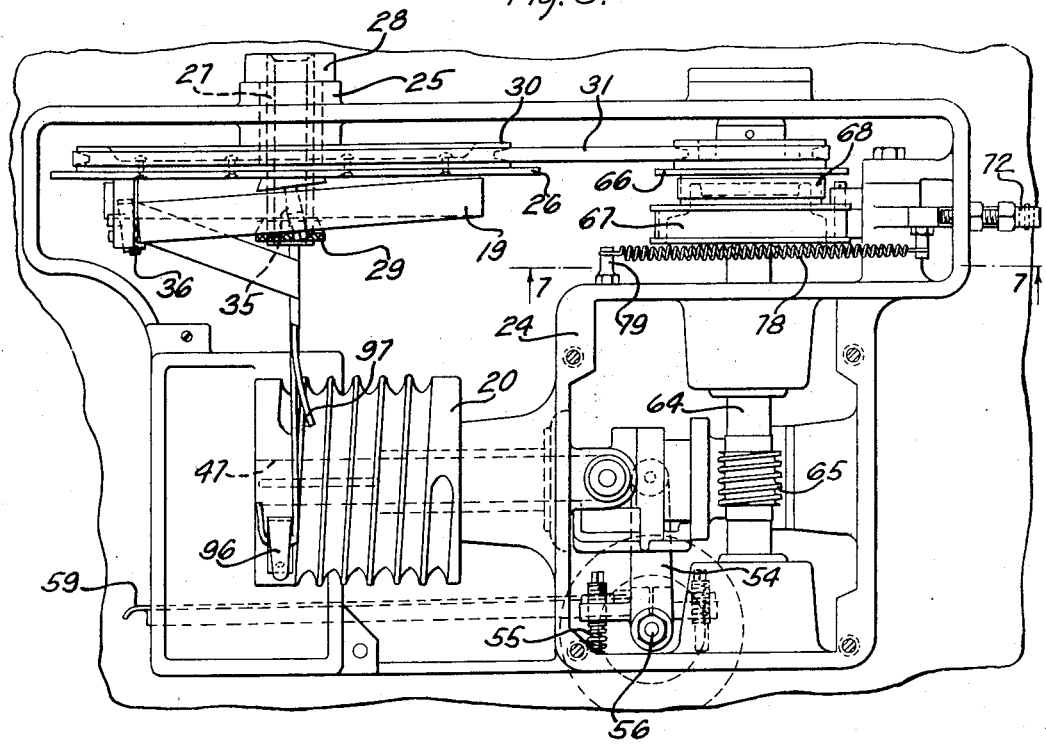

Patented Nov. 21, 1933

1,936,146

UNITED STATES PATENT OFFICE 1,936,146

METHOD OF AND APPARATUS FOR FORMING CABLES

William B. Wines, Oak Park, Ill., assignor to Western Electric Company, Incorporated, New York, N. Y., a corporation of New York Application December 6, 1929. Serial No. 412,148

11 Claims. (Cl. 117—41)

This invention relates to a method of and apparatus for forming cables, and more particularly to a method of and apparatus for forming short lengths of cables used in telephone loading coils.

An object of this invention is to provide an efficient, expeditious, and accurate method of and apparatus for forming cables.

In accordance with this object, one embodiment of the invention pertaining to apparatus whereby the novel method is practiced comprises a taping machine having a rotating taping head or disc having a central aperture concentrically of which is mounted the central opening of a roll of tape for wrapping conductors during their advancement through these apertures into a combined cable. An axially movable take-up capstan continuously advances the conductors along the same line through the central aperture of the tape, and both the taping head and capstan are simultaneously driven by a common means which is manually controlled and which allows the intermittent introduction of additional conductors to compose the cable. Means is also provided for releasing and reciprocating the capstan, as well as structure for guiding the tape, indicating apparatus denoting when the individual composite conductors should be introduced, and a shear for severing the completed cable.

A clear understanding of one embodiment of the invention will be had from the following description of the formation of a spindle cable for telephone loading coils, when taken in connection with the accompanying drawings illustrating the same, and wherein Fig. 1 is an elevational, general assembly view of the cable forming apparatus;

Fig. 2 is an enlarged, longitudinal cross sectional view of the cable take-up capstan, and also showing the taping head operating in conjunction therewith;

Fig. 3 is an enlarged plan view of the capstan and the taping head taken on the cross-sectional line 3—3 of the taping head housing in Fig. 1;

Fig. 5 is an enlarged detailed end view of a swivel roller for guiding the tape onto the cable;

Fig. 6 is a side view of the same roller;

Fig. 7 is an enlarged cross-sectional view of a combined brake and clutch for controlling the driving of the capstan and taping head, being taken on the line 7—7 of the taping head housing in Fig. 3.

Figure 1:
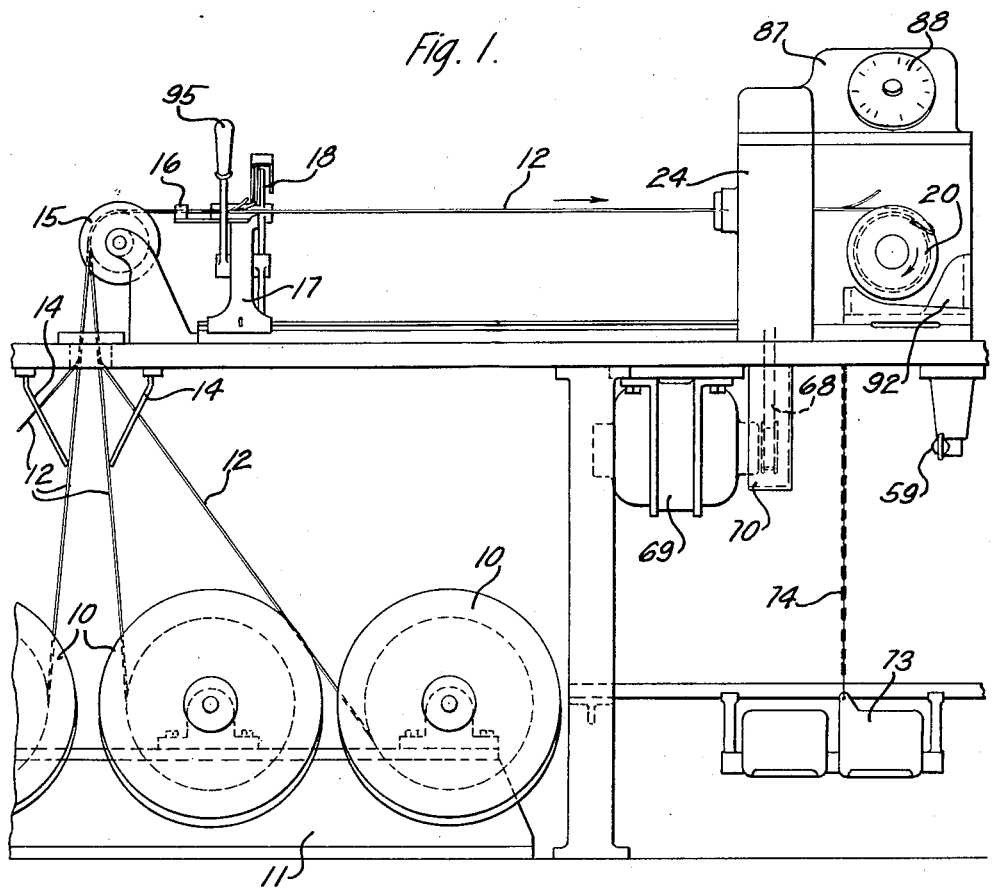

Referring now to the drawings in which like reference numerals designate similar parts throughout the several views, there is disclosed a plurality of conductor reel supplies 10 rotatably mounted on a base 11 and conductors 12 leading from these various supplies pass up through an aperture in a table 13 which supports the greater portion of the cable forming apparatus. The conductors 12 are directed through wire guide members 14 fixed to the table, thence over a pulley 15 and through a guide block 16 secured to a shear or severing knife 17 which is slidably mounted on the table 13 for controlling the length of the cable. As the conductors 12 pass through the guide block 16 they, of course, assume adjacent parallel positions and pass underneath the knife 18 of the shear 17, and the operator selectively or separately draws these separate conductors to the right, as described more fully later, conducting them through the central opening of a transversely supported roll of tape such as muslin, or other suitable material 19, from whence the conductors are wound on a capstan 20 which is so constructed to draw the conductors continually through the central portion of the tape.

In order to support the roll of tape 19 concentrically of the conductors 12 drawn therethrough, there is provided a housing 24 which is mounted on top of the table 13, and to a boss 25 in the housing there is journaled a disc or taping head 26 which is fixedly secured, as by riveting, to a sleeve 27 (Fig. 3) which projects through the boss and is retained therein by a nut 28, the roll of tape 19 being supported on the sleeve 27 adjacent to the disc 26 and between washers for providing rotation thereof. A knurled nut 29 threaded to the end of the sleeve 27 retains the tape roll thereon. Thus, it will be understood that the sleeve 27 provides for guiding the conductors 12 through the central opening of the tape roll 19, and that the disc 26 is free to rotate about the conductors as well as the roll of tape being free to rotate with respect to the disc. The disc 26 is driven by a pulley 30 secured to the back thereof and which is connected to a belt 31.

In order to guide the tape from the roll onto the conductors 12 as they are advanced by the capstan 20 to form the cable, two guide rollers 35 and 36 are provided, the guide roller 35 being rigidly secured to the disc 26 but disposed at an acute angle with respect thereto in order to guide the tape properly and the guide roller 36 being secured thereto by a swivel structure now to be described, said roller also having a spring 37 which retains the tape in engagement therewith. This swivel guide roller 36 is supported on the disc 26 by a bracket 38 (Figs. 5 and 6) which is adjustably secured thereto by screws which engage arcuate shaped slots 39 in the bracket for allowing a proper circular adjustment thereof. The guide roller 36 is supported from the bracket 38 by means of a yoke 44 supporting the ends of the roller shaft, which yoke is pivotally secured at 45 to an arm 40 which is rotatably mounted on a screw 41 threaded to the bracket 38. This screw is capable of being locked by a clamping device 42 forming a part of the bracket 38 and operated by a screw 43. Thus, the construction of the guide rollers 35 and 36 is believed to be apparent, and it will be noted that as the taping disc 26 is rotated in a counter-clockwise direction (Fig. 2) by the belt 31 and after the tape 19 has been manually started over the rollers 36 and 37 and initially wrapped around or secured to the conductors 12, a continued counter-clockwise rotation of the disc will cause the tape to be wrapped around the advancing conductors in a spiral formation. The swivel roller 36 will at all times provide for the proper angle at which the tape is wound upon the conductors while more conductors are introduced to furnish a larger cable. It is this swivel or pivotal action of the roller 36 about its overhead pivot 45 (Figs. 5 and 6) in the arm 40 which is the significant feature of its operation; as the diameter of the cable increases due to the introduction of more conductors 12 into the cable, the roller 36 with its yoke 44 swings freely about the pivot 45 to allow the wrapping tape to accommodate itself to the increasing cable diameter, thereby providing a uniform lap of the tape over itself throughout the length of the cable. That is, the roller 36 automatically adjusts the tape to the increasing diameter of the cable and maintains a uniform lap in the tape. The adjustment of the bracket 38 about the securing slots 39 (Fig. 5) and the arm 40 (Figs. 5 and 6) around the pivot screw 41 are simply for first properly lining up the roller 36 with the roller 35 (Fig. 2), when the bracket 38 and the arm 40 are firmly locked in the adjusted position. From then on the pivotal action of the roller 36 about the pivot 45 is the sole and only necessary adjustment feature of the roller.

For mounting the take-up capstan 20 and in order that it will always draw the cable through the central aperture of the taping disc 26, there is provided a shaft 47 to which the capstan 20 is keyed, which is journaled within the housing 24 and is provided at its right end (Fig. 2) with a threaded portion 48 engaging a corresponding threaded member 49 secured to the housing, this threaded construction at the right end of the shaft operating to move the capstan 20 to the left as it advances the cable, thus continuously draws the cable through the central aperture of the tape roll during the entire operation of the machine. The shaft 47 is driven by a releasable clutch or collar 50 (Fig. 2) which is slidably or movably keyed or splined to the shaft and which is provided with teeth at its right end for engaging corresponding teeth on a sleeve 51 which is keyed to a driving worm gear 52, said gear being freely journaled upon a smooth portion of the shaft 47 and incapable of transmitting motion thereto by itself. The releasing clutch 50 has a yoke 53 (Fig. 2) engaging therewith which is connected to a lever 54 (Fig. 3) which is normally retained by a spring 55 to cause the clutch 50 ordinarily to engage or be driven by the worm gear 52, thus driving the shaft 47. However, a vertical spindle 56 journaled within a boss 57 of the housing 24 and extending down through a bracket 58 secured to the bottom of the table 13 has secured at its lower end a knee lever 59 for moving the clutch 50 out of engagement with the driving gear 52 after the capstan 20 is filled with cable to enable the operator to withdraw the formed cable manually from the capstan and thereby rotate the shaft 47 back into its original position into engagement with the screw member 49. Thus, it is apparent how the capstan 20 is constructed so as to be advanced to the left by means of the threaded shaft 47 and how the clutch 50 is constructed so that it can be released to enable the operator to withdraw the cable and reciprocate the capstan to its starting position.

For driving the taping head 26 and the capstan 20, there is provided a common driving shaft 64 journaled at its ends within the housing 24 and which has keyed to it a worm gear 65 which engages the worm gear 52 for driving the capstan. For driving the taping head 26, there is secured to the other end of the shaft 64 a double pulley 66, one pulley of which engages the disc belt 31 and the other a belt 68 driven by a motor 69 supported by the under surface of the table 13, a shield 70 covering this belt. In order to actuate the common shaft 64 for driving both the taping head 26 and the capstan 20 the belt 68, which is normally loose and which is driven continuously by the motor 69, is tightened by means of an idler pulley 71 mounted on a lever 72 (Fig. 7) secured to the housing 24, this lever being actuated by a foot treadle 73 connected therewith by means of a chain 74 extending over suitable pulleys and then up to the lever 72. Normally the lever 72 is resiliently retracted by a spring 78 which is secured at 79 to the housing 24 and this retraction serves to tighten a brake band 67 against a drum provided therebeneath and secured to the pulley 66, the band 67 being secured at 80 to the housing 24 and at 81 to the lever 72, about the brake drum of the combination drum and double pulley 66 to maintain the shaft 64 driven thereby in a stationary position. Thus, it will be understood that the operator may at will drive both the taping head 26 and the capstan 20 simultaneously by depressing the foot treadle 73 to tighten the driving belt 68, and when he wishes to stop its operation he removes his foot from the treadle 73 to allow the spring 78 to retract the pulley 71 and loosen the driving belt 68, also thus tightening the brake band 67 around the drum 66 to maintain the capstan and taping head in a stationary position.

Slidably keyed to the central portion of the capstan shaft 47 and abutting against a portion of the housing 24 there is provided a bevel gear 82 which meshes with a bevel gear 83 mounted on the lower end of a vertical shaft 84 journaled within the housing 24, and at the top end of the shaft 47 there are bevel gears 85 and 86, the latter gear being journaled to a cover 87 for the housing 24 and driving an inclined dial 88 for indicating to the operator the extent of the rotation of the take-up capstan 20 during the cable forming process. A deflector 92 is provided underneath the capstan 20 for bending or guiding projecting or tapping ends of the conductors as they are formed into cables and rotated by the capstan. The shear 17 is normally retained in the open position by means of a spring 93 (Fig.

Figure 4:
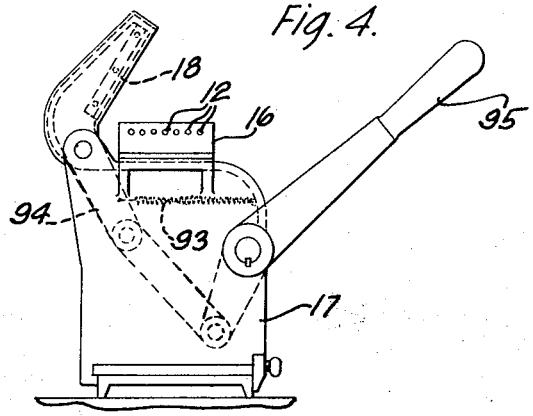
Fig. 4 is an enlarged elevational end view of the shear for severing the cable.

4), which is connected to a lever 94 associated with the blade 18, and the blade 18 and the handle 95 thereof are interlinked with suitable levers to maintain an increasing leverage upon the blade 18 as the handle 95 is depressed, so that the conductors at the right-hand side of the guide block 16 (Fig. 4) will be as easily and as readily cut as those at the left-hand side of the guide block. From the foregoing description the construction of the cable forming apparatus is believed to be apparent.

Figure 8:
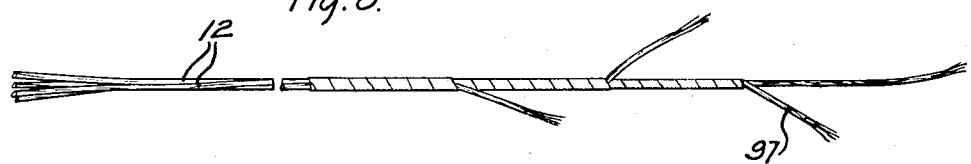
Fig. 8 is a view of the formed cable showing the relative positions of the conductor ends.

In the operation of the cable forming device, the operator draws one of the conductors 12 from its projecting position at the right-hand of the guide block 16, conducts it through the central sleeve 27 of the taping disc 26 and then through the central aperture roll of the tape 19, securing the end thereof to a hook 96 provided at the left-hand end (Fig. 3) of the capstan 20. The foot treadle 73 is then depressed to drive the shaft 64 as before described and rotate the capstan to take up or wind the first conductor 12 in the capstan groove until the dial 88 indicates to the operator that it is time to introduce the second conductor, when he releases the foot treadle 73 and draws the second conductor 12 through the central sleeve 27 and manually wraps the end of the tape 19 around the two conductors, leaving a tap or projecting end 97 for later making connection with one of the smaller coils comprising the larger loading coil when the cable is installed therein. The foot treadle 73 is next depressed to rotate the tape 19 about the two conductors 12 to bind them into a composite cable, which is continued until the dial 88 indicates that a third conductor should be introduced, and the third conductor is inserted through the tube 27 and underneath the tape 19, leaving a tapping end similar to the end 97 of the second conductor projecting from the cable, when the operator again steps on the treadle 73 and causes the taping head 26 to wind tape about all three conductors. From now on the operation is similar, consisting simply in introducing other conductors at the times indicated by the dial 88, and after a sufficient number of the conductors have been introduced and wrapped the tape 19 is manually severed and glued to the cable. The operator then depresses the lever 95 of the shear 17 to sever or cut the length of cable so formed. The knee lever 59 is now rotated to release the clutch 50 from the driving gear 52 as aforedescribed, thus allowing the operator to manually withdraw the formed cable from the capstan 20 by providing for a free retraction of the capstan to its former position. The next spindle cable is then formed in the same manner as the one just described. Thus, it is apparent how the take-up capstan 20 continually advances the cable being formed in a direction coaxial of the taping head 26 and the roll of tape 19, and that while the capstan is thus advanced the taping head 26 simultaneously deposits a spiral layer of tape about the conductors to bind them into one composite cable having taps for later connections to the coils of the loading coil. The finished cable appears as clearly shown in Fig. 8, consisting of the conductors 12 which are of different lengths and have taps or free projections extending from the cable at various points therealong for making connections with the different adjoining coils of the loading coil.

It is therefore obvious that the method and apparatus provided by this invention serve efficiently and expeditiously to form short lengths of cables for telephone loading coils and that the invention is equally applicable for forming many other types of wrapped cable.

It is, of course, to be understood that although the foregoing description pertains to one specific embodiment of the invention, the invention is to be limited only by the scope of the appended claims.

What is claimed is:

1. A method of forming a cable, consisting in successively advancing a plurality of conductors along side of each other in a stepped formation, winding material about the conductors so advanced to bind them into a cable, and severing the conductors to determine the cable length.

2. A method of forming successive cables, consisting in successively advancing conductors along side of each other at predetermined intervals, wrapping material about the conductors so advanced to form the successive cables, and successively severing the grouped conductors into cable lengths.

3. In an apparatus for forming a cable, means for selectively supplying a plurality of conductors, means for successively taking up the individual conductors as they are selectively advanced along side of each other in a stepped formation, means for supporting a roll of wrapping material concentrically of the advancing conductors, and swivel means attached to the last means for automatically applying the wrapping material through a varying angle to the successively advanced conductors to bind them into a cable.

4. In an apparatus for forming a cable, means for supplying a plurality of conductors, means for successively advancing the individual conductors along side of each other in a stepped formation, means for supporting a roll of wrapping material concentrically of the advancing conductors, and a roller attached to the last means for guiding the wrapping material onto the successively advanced conductors to bind them into a cable, said roller having a pivotal means for automatically varying the angle at which the wrapping material is applied to the cable as it increases in diameter.

5. In an apparatus for forming a tapering cable, means for supplying successive conductors, means for supporting a wrapping material concentrically of the successive conductors, means for applying the wrapping material to the successive conductors at a varying angle to bind them into a tapering cable, a capstan for advancing the conductors concentrically of the material, and means for moving the capstan axially of itself to provide a continual advancement of the conductors in the same concentric path.

6. In an apparatus for forming a tapering cable, means for supplying successive conductors, variable means concentric of the successive conductors for binding them into a tapering cable, a capstan for taking up the bound cable, a screw actuating structure for the capstan to move it axially of itself and preserve said concentric disposition of the conductors, and a release for said actuating structure for reciprocating the capstan back to its original position and removing the cable.

7. In an apparatus for forming cables, means for mounting a roll of tape, means for successively advancing conductors concentrically of the roll in a stepped formation, means for indicating when the successive conductors should be advanced, means for wrapping the tape about the conductors to bind them into cables, and means for severing the conductors to determine the lengths of the cables.

8. A method of forming a tapering tapping cable, consisting in successively advancing insulated conductors in the same longitudinal direction at spaced intervals, wrapping the successively advanced conductors to form a cable which is tapering at the advanced end, severing all the conductors at the same point to determine the length of the cable, and leaving the advanced tips and severed ends of the conductors free of wrapping material for connection purposes.

9. In an apparatus for forming a cable, means for selectively supplying a plurality of conductors, a rotatable member for supporting ribbon like material for wrapping the conductors, a hollow shaft for supporting said rotatable member and through which the conductors may be fed, spiral means for advancing the conductors intermittently as the ribbon like material is supplied thereto, and means carried by said rotatable member for guiding the material to the conductors during the actuation of said rotatable member as the conductors are individually selected and advanced along side of each other in a stepped formation.

10. In an apparatus for forming a cable, means for advancing conductors, means for supporting a roll of flat wrapping material, means for imparting movement to said roll to wrap the material around the conductors while advancing, a member for guiding the material from the roll to the conductors, and means for supporting said guide member for free movement by the flat wrapping material to vary the axial position of said guide member to compensate for lateral variations in the position of the material during the wrapping operation.

11. In an apparatus for forming a tapered cable, means for successively advancing conductors, means for supporting a roll of substantially flat wrapping material, means for imparting movement to said roll of wrapping material to wrap the material around the conductors while successively advanced, and a member for guiding the material from the roll to the conductors, said guide member being freely movable during the wrapping operation to vary its axial position relative to the advanced conductors as the cable increases in size by the addition of successive conductors.

WILLIAM B. WINES.